(12) United States Patent
Min et al.

(10) Patent No.: US 8,208,022 B2
(45) Date of Patent: Jun. 26, 2012

(54) APPARATUS AND METHOD FOR REMOVING BLOOMING OF CAMERA IMAGE

(75) Inventors: Chol Min, Pyeongtaek-si (KR); Sungha Seo, Pyeongtaek-si (KR); Namkyu Ahn, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 428 days.

(21) Appl. No.: 12/478,289

(22) Filed: Jun. 4, 2009

(65) Prior Publication Data

US 2009/0303356 A1     Dec. 10, 2009

(30) Foreign Application Priority Data

Jun. 5, 2008  (KR) .......................... 10-2008-0052925
Jun. 5, 2008  (KR) .......................... 10-2008-0052926

(51) Int. Cl.
*H04N 7/18* (2006.01)

(52) U.S. Cl. ........................................ 348/148; 340/937

(58) Field of Classification Search ................... 348/148; 382/104; 340/937
See application file for complete search history.

(56) References Cited

U.S. PATENT DOCUMENTS

| | | | | |
|---|---|---|---|---|
| 5,809,161 | A * | 9/1998 | Auty et al. | 382/104 |
| 7,619,649 | B2 * | 11/2009 | Kogure et al. | 348/148 |
| 2003/0122930 | A1 * | 7/2003 | Schofield et al. | 348/148 |
| 2008/0278577 | A1 * | 11/2008 | Otsuka et al. | 348/113 |
| 2010/0054538 | A1 * | 3/2010 | Boon | 382/104 |

* cited by examiner

*Primary Examiner* — Jordan Schwartz
(74) *Attorney, Agent, or Firm* — Birch, Stewart, Kolasch & Birch, LLP

(57) ABSTRACT

An apparatus and a method for removing blooming of a camera image are provided. When a lane marking is not normally detected from an image obtained by photographing a front view or a rear view of a car, it is determined whether the blooming is generated in the image. When it is determined that the blooming is generated, a mask for removing the blooming is generated and superposed on the image. Accordingly, a situation that the lane marking is not normally detected due to the blooming caused by a head light of a car can be reduced or prevented in advance.

8 Claims, 9 Drawing Sheets

FIG. 7
Normal Status
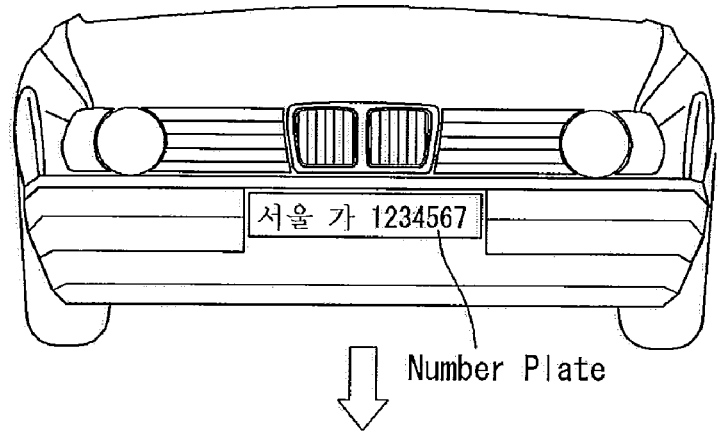
Number Plate
Backlight & Blooming Status
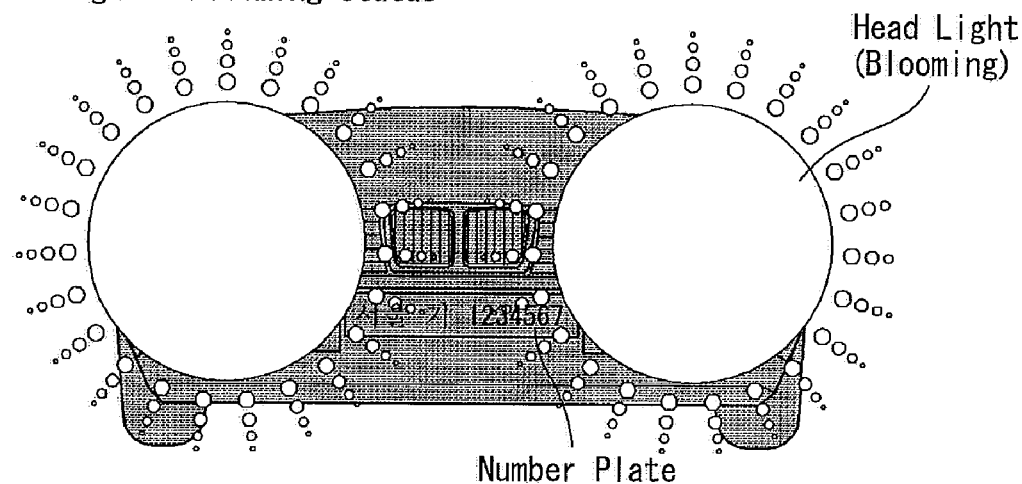
Head Light (Blooming)
Number Plate
Backlight-compensated & Blooming-removed Status
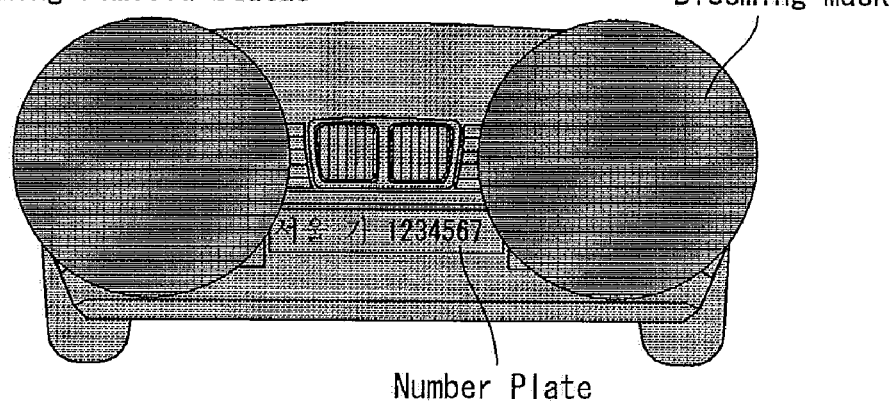
Blooming Mask
Number Plate

FIG. 9
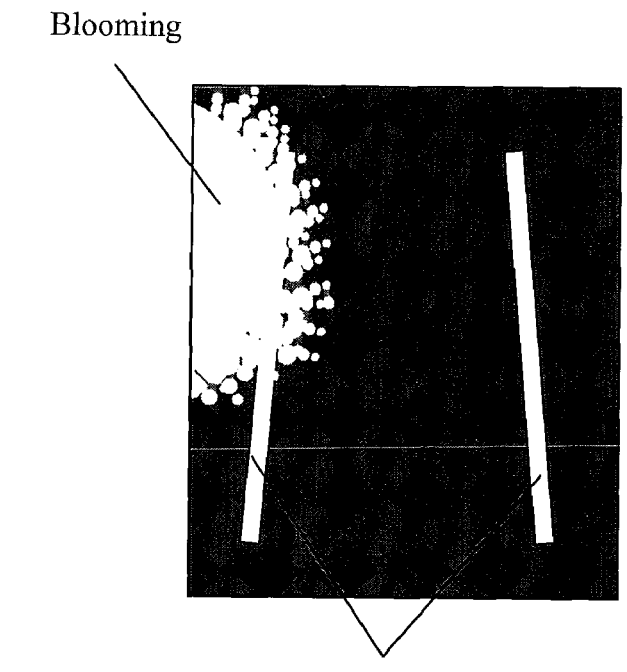
Blooming
Lane
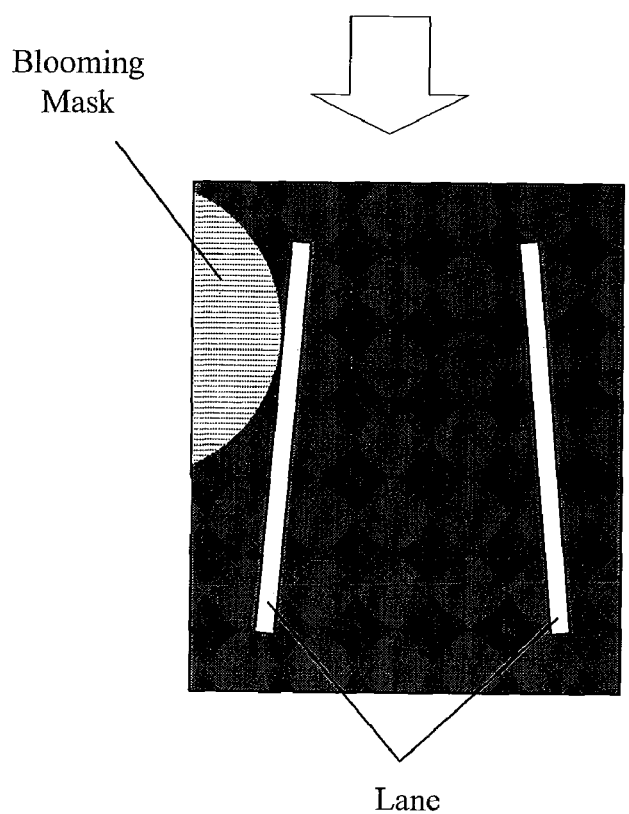
Blooming Mask
Lane

APPARATUS AND METHOD FOR REMOVING BLOOMING OF CAMERA IMAGE

This nonprovisional application claims priority under 35 U.S.C. §119(a) from Patent Application Nos. 10-2008-0052925 and 10-2008-0052926 filed in the Republic of Korea on Jun. 5, 2008, the entire contents of which are hereby incorporated by reference.

BACKGROUND OF THE INVENTION

1. Field of the Invention

The embodiments of the present invention relate to an apparatus and a method for removing blooming of a camera image.

2. Discussion of the Related Art

As illustrated in FIG. 1, a monitoring camera is located in a specific area, captures an image and outputs the captured image to a digital video recorder (DVR). The DVR stores the captured image as a data file in a recording medium such as a hard disc and/or displays the captured image on the screen of a monitor. An operator who operates the DVR monitors images captured by the monitoring camera through the monitor in real time or reproduces data files stored in the recording medium to observe or monitor previously captured images.

The camera may have a backlight function or a backlight compensation function. When a very bright object or a light source exists in an image captured by the camera in a backlight compensation mode, the camera performs a backlight compensation operation for compensating exposure, which further opens its iris to increase the quantity of light input to an image-capturing element such as a charge-coupled device (CCD) or a complementary metal oxide semiconductor (CMOS), or increases amplification gain of a signal output from the image-capturing element, such that a relatively dark object around the light source or the bright object can be identified.

When the backlight compensation operation is performed, the luminance level of a low luminance region increases, and thus a user can normally recognize the dark object. However, the luminance level of a high luminance region also increases to generate blooming that makes the bright object seem saturated by light.

For instance, when the camera photographs the front side of a car in a normal status, numbers on a number plate are normally seen, as illustrated in FIG. 2. When the head light of the car is turned on, however, the luminance of the number plate located besides the head light is relatively low in comparison, and thus the numbers on the number plate are less visible.

Accordingly, when a high luminance region and a low luminance region exist together in an image, the camera determines that the current status thereof corresponds to a backlight status and performs the backlight compensation operation to open the iris and increase the gain. At this time, both the luminance level of the low luminance region and the luminance level of the high luminance region increase, and the luminance level of the high luminance region, such as the headlight of the car, excessively increases to result in a blooming phenomenon that cause regions around the head light to be seen as irregular white regions, as illustrated in FIG. 2. Consequently, the numbers on the number plate cannot be easily identified.

SUMMARY OF THE INVENTION

It is an object of the present invention to provide an apparatus and a method for effectively removing blooming caused by a high luminance object in an image.

According to an embodiment of the present invention, there is provided a method for removing blooming of a camera image, which includes detecting a lane marking from an image obtained by photographing a front view or a rear view of a car; determining whether the blooming is generated in the image when the lane marking is not normally detected; and generating a mask for removing the blooming and superposing the mask on the blooming of the image when it is determined that the blooming is generated.

According to an embodiment of the present invention, there is provided an apparatus for removing blooming of a camera image, which includes a signal processor configured to detect a lane marking from an image obtained by photographing a front view or a rear view of a car; a luminance detector configured to detect a luminance of the image; a mask generator configured to generate a mask; and a controller configured to confirm whether the blooming is generated through the luminance detector when the signal processor does not normally detect the lane marking, and generate the mask for removing the blooming and superposing the mask on the image through the mask generator when the blooming being generated is confirmed.

The controller may determine that the blooming is generated when the luminance detector detects more than a predetermined number of pixels having high luminance levels higher than a high luminance reference level. The high luminance reference level may be set to a value greater than 80% of a maximum luminance level of each pixel and the predetermined number of pixels may be set to a value greater than 1% of a maximum number of pixels.

The controller may control the mask generator to generate the mask having a low luminance level and superposes the mask on a high luminance level region corresponding to the blooming in the image. The mask generator may generate the mask having a shape corresponding to the high luminance level region in the image.

According to an embodiment of the present invention, there is provided a method of compensating an image from an image capture device including obtaining the image using the image capture device, the image having pixels with different luminance values; determining whether a defined percentage of the pixels exceeds a defined luminance level; generating a mask if the defined percentage of the pixels exceeds the defined luminance level; and compensating a region of the image that includes the pixels that exceeds the defined luminance level using the mask.

According to an embodiment of the present invention, there is provided an apparatus for compensating an image including a luminance detector configured to detect luminance levels of pixels of the image; a controller configured to determine whether a defined percentage of pixels of the image exceeds a defined luminance level; and a mask generator to generate a mask if the defined percentage of the pixels exceeds the defined luminance level, wherein the controller compensates a region of the image that includes the pixels that exceeds the defined luminance level using the mask.

Accordingly, blooming caused by a high luminance region existing in an image can be effectively removed, and thus a situation that a traffic lane is not normally detected due to blooming caused by the head light of a car, for example, can be prevented in advance.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 illustrates removal of blooming in a camera image according to another embodiment of the present invention;

FIG. 9 illustrates removal of blooming in a camera image according to another embodiment of the present invention.

DETAILED DESCRIPTION OF THE PREFERRED EMBODIMENTS

Hereinafter, example embodiments of an apparatus and a method for removing blooming of a camera image according to the present invention will be described below with reference to the accompanying drawings.

The apparatus and method for removing blooming of a camera image according to the present invention can be applied to cameras of various types having image-capturing elements such as CCDs or CMOSs widely used to capture still images or moving images, such as a monitoring camera.

Figure 3:
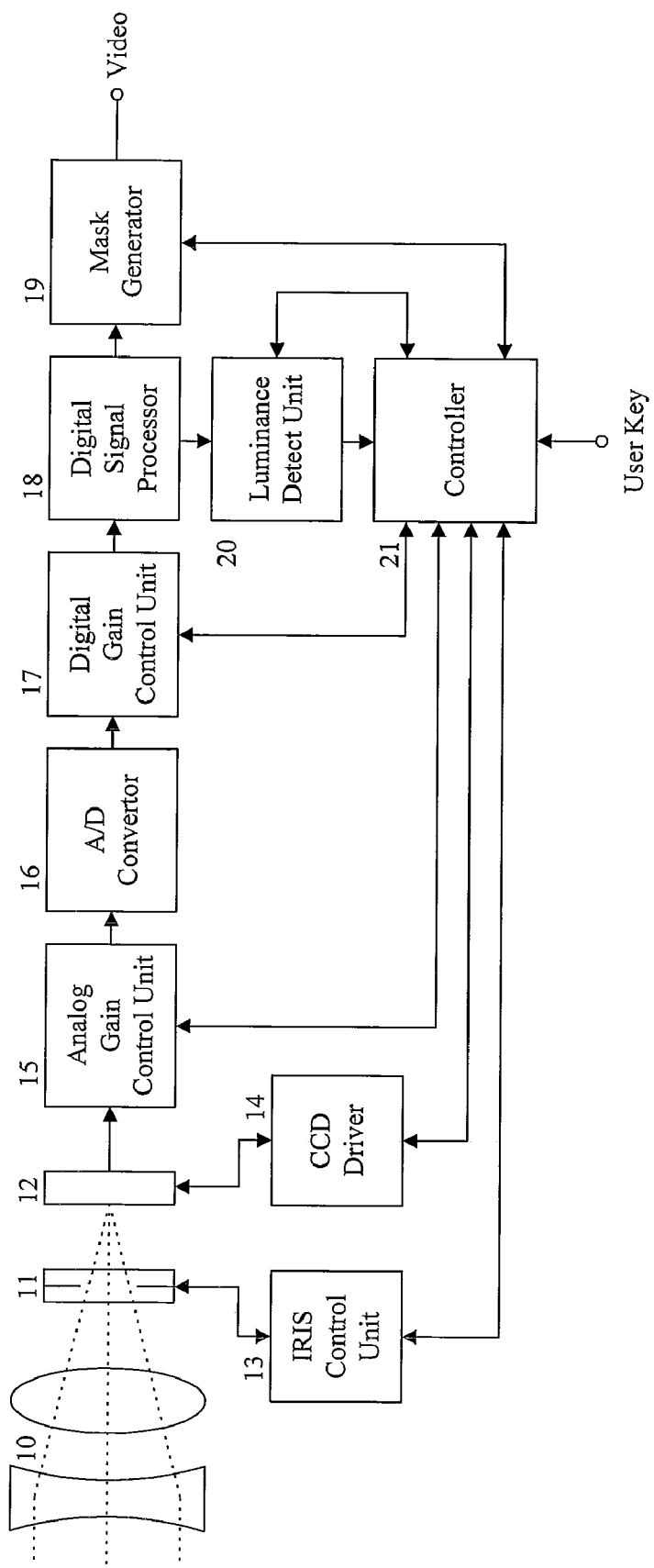
FIG. 3 illustrates a configuration of a camera according to an embodiment of the present invention.

FIG. 3 illustrates a configuration of a camera to which the present invention is applied. The camera includes one or more lenses 10, an iris 11, an image-capturing element 12, an iris control unit 13, a CCD driver 14, an analog gain control unit 15, an analog-to-digital (A/D) converter 16, a digital gain control unit 17, a digital signal processor 18, a mask generator 19, a luminance detector (luminance detect unit) 20, and a controller 21.

The luminance detector 20 scans image data processed by the digital signal processor 18 pixel by pixel to detect the luminance level of each pixel and detects a backlight status when it is determined that a high luminance region and a low luminance region exist together in a captured image from the pixel scan result.

When the backlight status is detected, the controller 21 performs a conventional backlight compensation operation in such a manner that the controller 21 controls the iris controller 13 to open the iris 11 wider, decreases the speed of a shutter (not shown) or controls the analog gain control unit 15 to raise the amplification gain of a signal output from the image-capturing element 12.

When the backlight compensation operation is performed, the controller 21 analyzes the luminance level of each pixel, detected by the luminance detector 20, to determine whether blooming is generated, and controls the mask generator 19 to generate a mask and superpose the mask on a specific region of the captured image, which will be explained in more detail.

Figure 4:
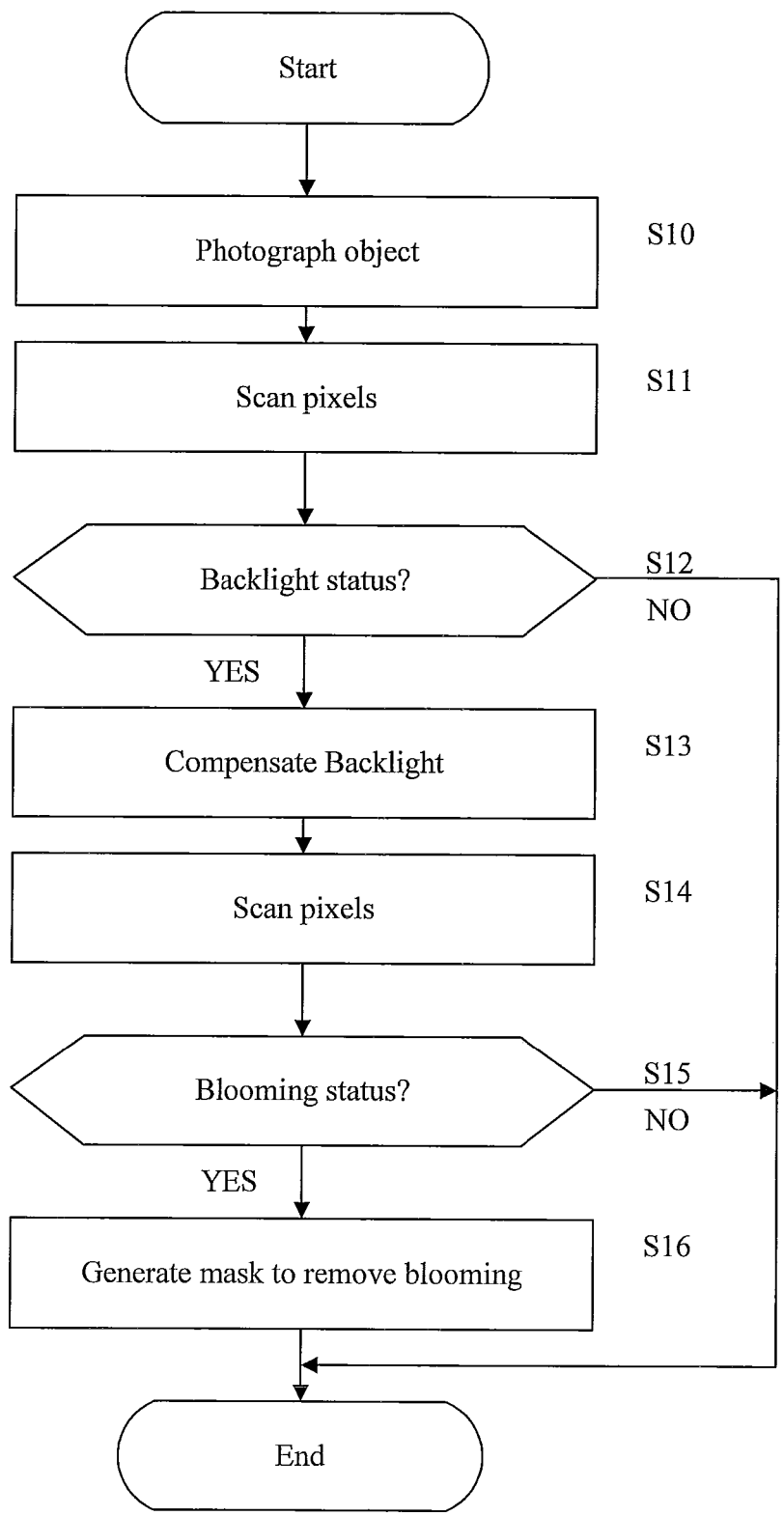
FIG. 4 is a flowchart of a method for removing blooming of a camera image according to an embodiment of the present invention.

FIG. 4 is a flowchart of a method for removing blooming of a camera image according to an embodiment of the present invention. For instance, the camera, such as a monitor camera, is installed in a place such as an underground parking lot in order to monitor entrance/exit of cars and photographs, a car, for example, as an object in step S10. Here, the luminance detector 20 of the camera scans video frames of a captured image, processed by the digital signal processor 19, pixel by pixel in step S11.

When it is determined from the scanning result that a high luminance region and a low luminance region simultaneously exist in the captured image, for example, when a low luminance region having a luminance level lower than 100 in a predetermined set luminance level range of 0 to 4095 and a high luminance region having a luminance level higher than 3500 simultaneously exist in the captured image, the luminance detector 20 outputs a signal representing the backlight status to the controller 21.

Though an image having a high-purity white region and black region may be determined to be an image having both a high luminance region and a low luminance region, the luminance detector 20 can recognize in such a case that the white region and the black region simply coexist in the image in consideration of color information of each pixel and existence of light spread generated in a high luminance region as well as luminance.

When the controller 21 receives the signal representing the backlight status in step S12, the controller 21 gives a weight to the low luminance region in the captured image and performs the backlight compensation operation such as opening the iris, decreasing a shutter speed and increasing analog gain S13.

Accordingly, the luminance level of the low luminance region in the captured image increases and the luminance level of the high luminance region also increases. The controller 21 analyzes the luminance level of each pixel, detected by the luminance detector 20, in step S14 when performing the backlight compensation operation. Here, the controller 21 determines that blooming is generated when the luminance level of the high luminance region is greater than 80% of a maximum luminance level and the number of pixels corresponding to greater than 80% of the maximum luminance level is greater than 1% of a maximum number of pixels. For example, the controller 21 determines that blooming is generated when at least 5000 pixels among 470000 pixels have luminance levels higher than 4000 when a maximum luminance level is 4095.

In embodiments of the present invention, the luminance level of the high luminance region may be larger or smaller than 80% of the maximum luminance level, and the number of pixels corresponding to greater than a particular percentage of the maximum luminance level may be larger or smaller than 1% of a maximum number of pixels. That is, the controller 21 may determine that blooming is generated when there are a low number of high luminance level pixels. Such determination by the controller 21 may be made relative to a predetermined number or value.

Figure 5:
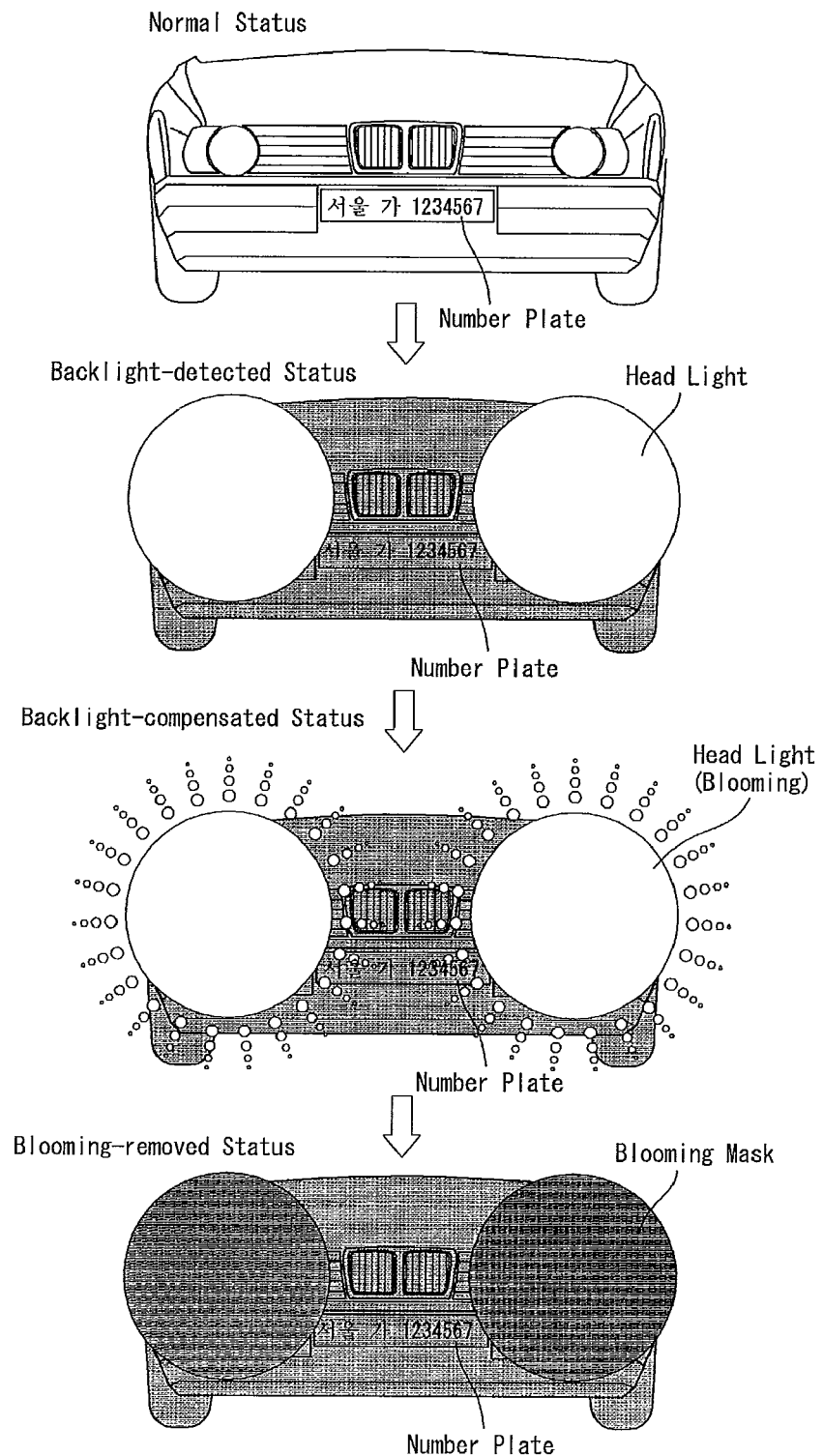
FIG. 5 illustrates removal of blooming in a camera image according to an embodiment of the present invention.

Referring to FIG. 5, when the camera photographs the front side of a car with a head light turned on, exposure is controlled based on the head light, and thus the camera is in the backlight state in which the number plate of the car considerably darkens so that the number plate cannot be recognized. When the backlight compensation operation such as iris opening, shutter speed decrease and/or gain increase is performed in the backlight status, blooming is generated in the portion corresponding to the head light although the luminance of the number plate increases, and thus the number plate becomes partially covered and cannot be recognized.

When the controller 21 determines that the blooming is generated in step S15, the controller 21 controls the mask generator 19 to generate a mask. The mask is an opaque or semitransparent image in gray having a low luminance component, for example. The mask is superposed on the head light in the image having the blooming to remove the blooming in step S16. Accordingly, the number plate of the car can be normally recognized.

The mask may have a previously set specific form such as a square or a circle, or have a size and a shape corresponding to the high luminance region (or the blooming) in the captured image.

Figure 6:
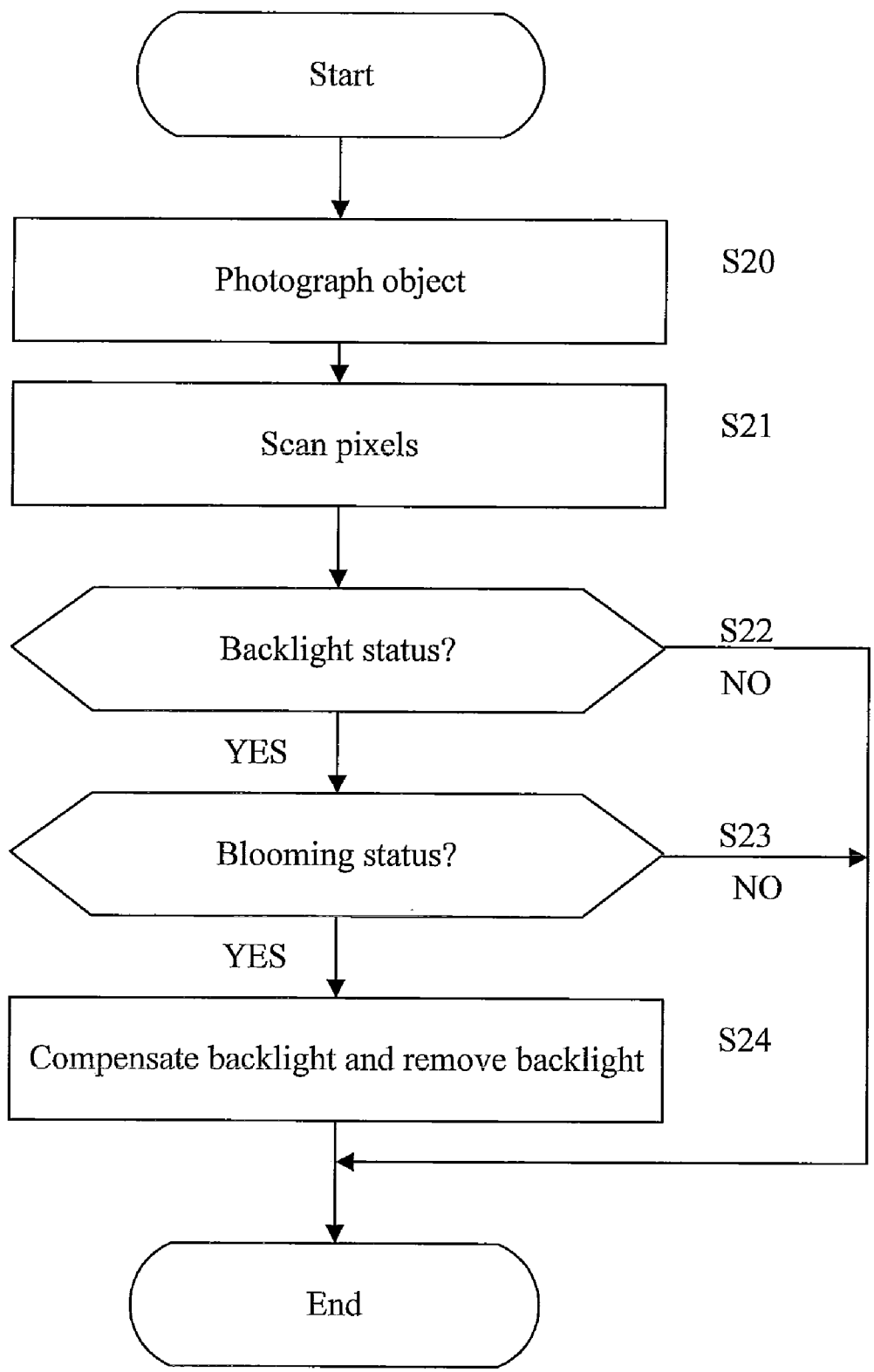
FIG. 6 is a flowchart of a method for removing blooming of a camera image according to another embodiment of the present invention.

FIG. 6 is a flowchart of a method for removing blooming of a camera image according to another embodiment of the present invention, which is similar to the method for removing blooming of a camera image, illustrated in FIG. 4. While the method for removing blooming of a camera image, illustrated in FIG. 4, performs the backlight compensation operation first when the backlight status is detected, scans pixels again and generates the mask when determining that blooming is generated, the method for removing blooming of a camera image, illustrated in FIG. 6, confirms the backlight status in step S22, determines whether blooming is generated in step S23 without performing the backlight compensation operation when the backlight status is detected and generates the mask or additionally performs the backlight compensation operation when it is determined that blooming is generated.

The controller 21 may analyze the luminance level of each pixel, detected by the luminance detector 20, to determine whether blooming is generated irrespective of the backlight status, and then control the mask generator 19 to superpose the mask on a blooming portion in the captured image to remove the blooming from the camera image.

The apparatus and method for removing the blooming of a camera image according to the present invention can be applied to a camera attached to a car, which photographs a front view of the car when the car runs (driven) or photographs a rear view of the car when the car is parked such that a driver can effectively confirm parking stripes.

A camera applied to a lane departure warning system photographs a front view of a road on which a car runs (or is driven), detects lanes of the road in the photographed image via road surface markings (such as road stripes, or lane markings, including center lines and side lines), analyzes variations in the gradients of the detected road surface markings and outputs a warning message such that the running car does not depart from the lanes.

A camera applied to a rear parking assistance system photographs a rear view of a car and outputs a warning message such that the car does not depart from lanes in the photographed image, that is, both parking stripes drawn on the floor of a parking space. The camera applied to the rear parking assistance system can use a wide-angle lens capable of photographing a wide range, for example, a fish-eye lens. In this case an X-shaped image can be captured.

Figure 8:
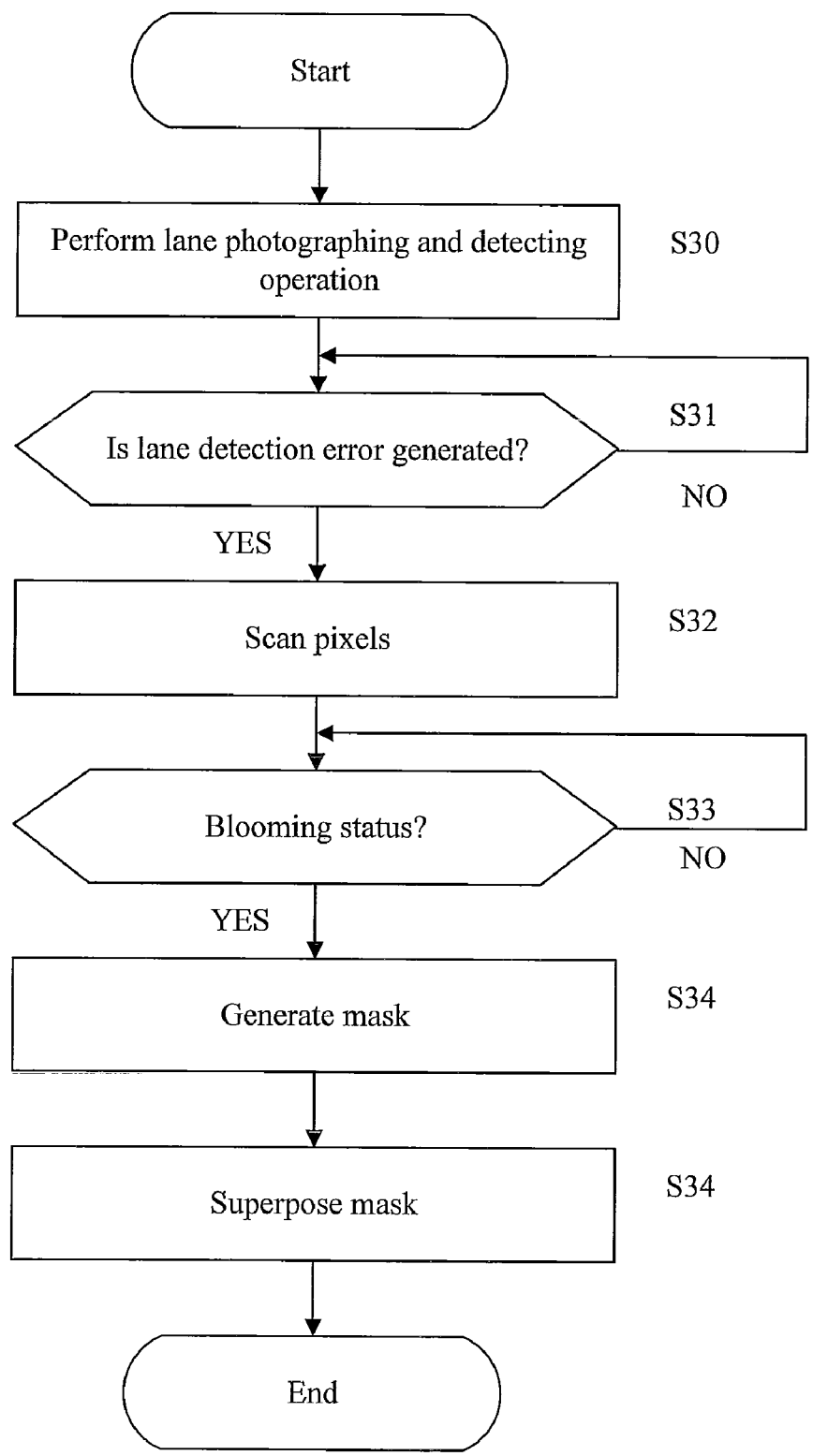
FIG. 8 is a flowchart of a method for removing blooming of a camera image according to another embodiment of the present invention.

FIG. 8 is a flowchart of a method for removing blooming of a camera image, which is applied to a camera for vehicles, according to an embodiment of the present invention. Referring to FIG. 8, the camera applied to the lane departure warning system or the rear parking assistance system, as described above, performs a conventional lane photographing and detecting operation in step S30.

The controller 21 of the camera determines whether both road surface markings of a road are normally detected in the photographed image through the digital signal processor 18 in step S31. For example, both road surface markings are not normally detected due to generated blooming caused by a head light of a neighboring car, as illustrated in FIG. 9, the controller 21 controls the luminance detector 20 to scan and analyze the luminance level of each pixel of the photographed image in step S32.

When the photographed image has a high luminance region having a luminance level greater than 80% of a maximum luminance level and the number of pixels corresponding to the luminance level greater than 80% of the maximum luminance level is greater than 1% of a maximum number of pixels, the controller 21 determines that blooming is generated in step S33. For example, the controller 21 determines that blooming is generated when at least 5000 pixels among 470000 pixels have luminance levels higher than 4000 when a maximum luminance level is 4095.

When it is determined that blooming is generated, the controller 21 controls the mask generator 19 to generate a mask image in step S34. Here, the controller 21 controls the mask generator 19 to generate a mask image having a shape corresponding to the shape of the high luminance region having the blooming.

Accordingly, the mask image corresponding to the shape of the high luminance region having blooming in the photographed image is generated, as illustrated in FIG. 9, and superposed on the photographed image in step S34. Consequently, the blooming generated in a part of the lanes is removed, and thus the lanes can be normally detected and a driver can normally confirm the lanes through a monitor.

The embodiments of the present invention can be applied to handheld cameras carried by users, as well as monitoring cameras installed in specific areas, cameras attached to vehicles, webcams, cameras in cell phones, other mobile devices, and others.

Figure 1:
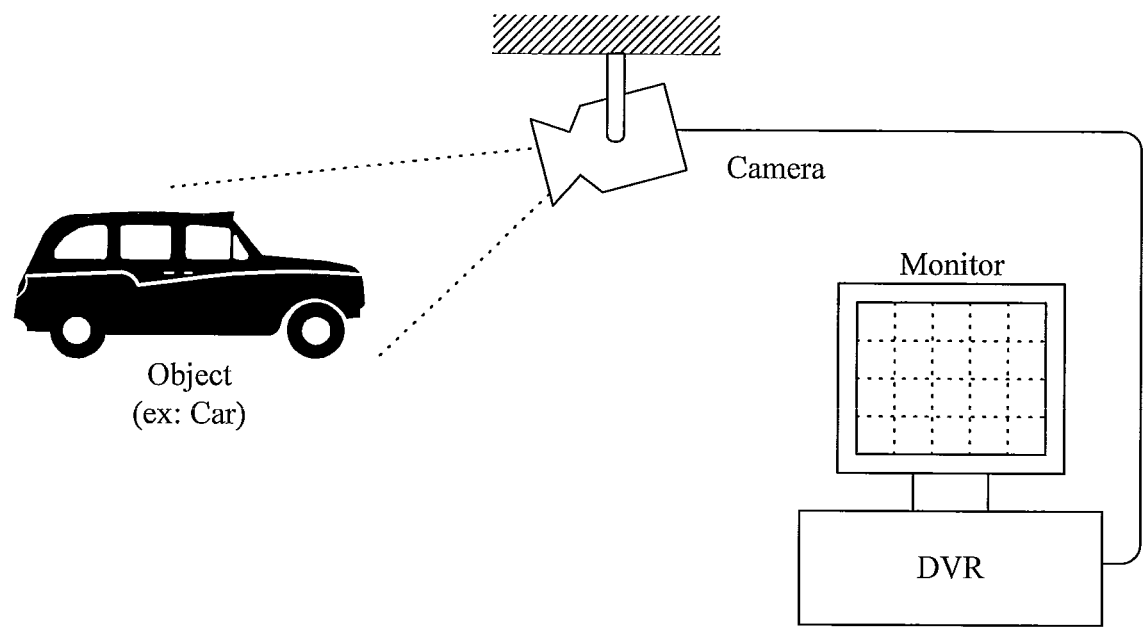
FIG. 1 illustrates a connection of a camera and a digital video recorder.
Figure 2:
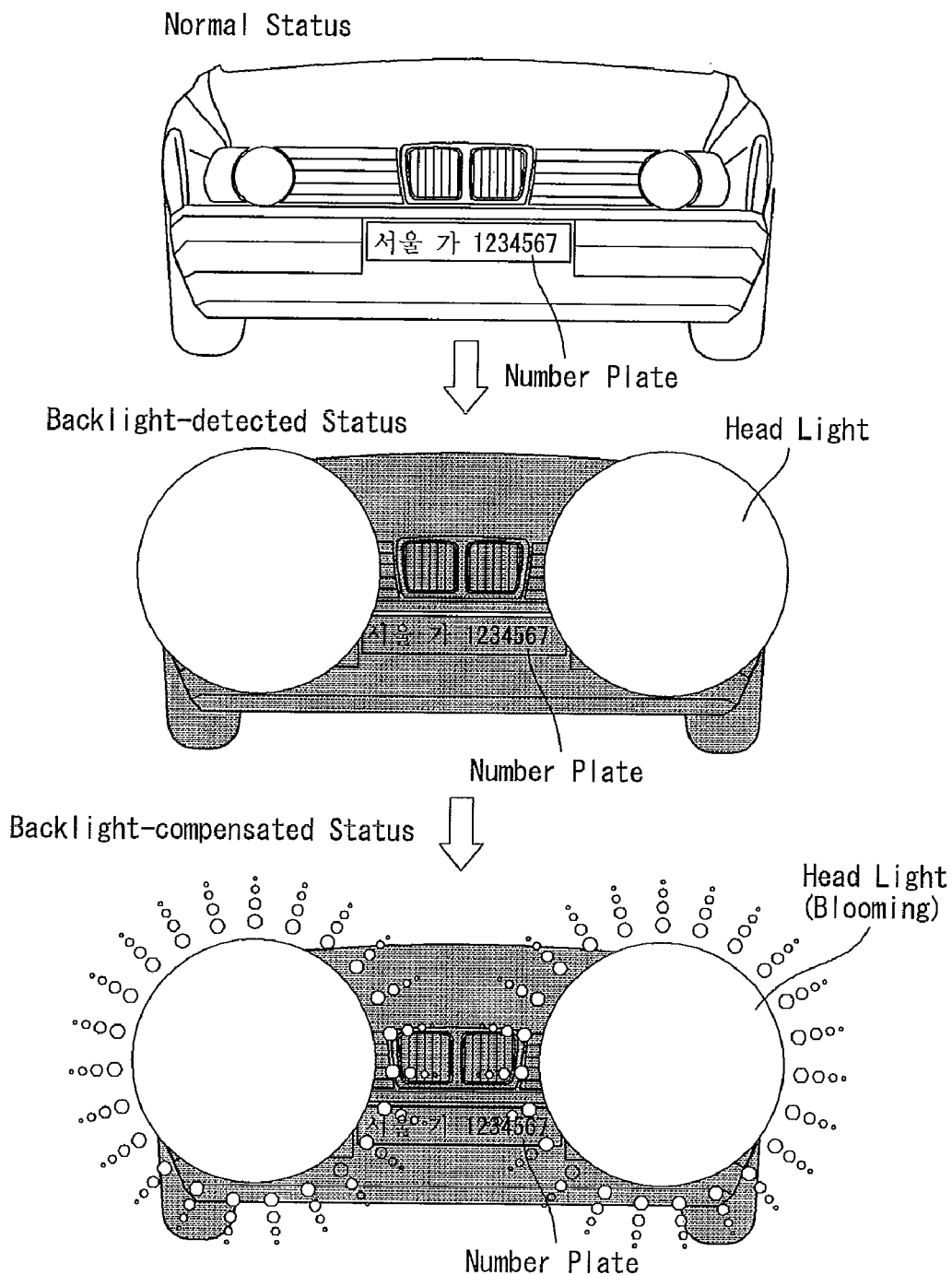
FIG. 2 illustrates blooming generated in a general camera image.

In FIGS. 2, 5 and 7, for example, the license plate of the car includes Korean characters, but such is not required. In the United States, for example, license plates are often alphanumeric.

Although discussed in terms of a headlight, any light source is within the scope of the present invention, such as ceiling lights, street lights, and others.

Although discussed in terms of the mask covering or removing the blooming, the mask may simply decrease the brightness of the blooming, or change the blooming to a different color. Additionally, the mask may be a graphic symbol, such as a yellow smiley face, or a dollar sign.

While the present invention has been particularly shown and described with reference to example embodiments thereof, it will be understood by those of ordinary skill in the art that various changes in form and details may be made therein without departing from the spirit and scope of the present invention as defined by the following claims.

What is claimed is:

1. A method for removing blooming of a camera image, the method comprising:
    detecting a lane marking from an image obtained by photographing a front view or a rear view of a car;
    determining whether the blooming is generated in the image when the lane marking is not normally detected; and
    generating a mask for removing the blooming and superposing the mask on the blooming of the image when it is determined that the blooming is generated,
    wherein the determining of whether the blooming is generated comprises scanning pixels of the image and determining that the blooming is generated when at least a predetermined percentage of the scanned pixels have luminance levels higher than a luminance reference level.

2. The method of claim 1, wherein the luminance reference level is set to a value greater than 80% of a maximum luminance level of each pixel, and the predetermined percentage is set to a value greater than 1% of a maximum number of pixels of the image.

3. The method of claim 1, wherein the generating and superposing comprises generating the mask having a low luminance level and superposing the mask on a high luminance level region corresponding to the blooming in the image.

4. The method of claim 3, wherein the mask has a shape corresponding to the high luminance level region in the image.

5. An apparatus for removing blooming of a camera image, the apparatus comprising:
- a signal processor configured to detect a lane marking from an image obtained by photographing a front view or a rear view of a car;
- a luminance detector configured to detect a luminance of the image;
- a mask generator configured to generate a mask; and
- a controller configured to confirm whether the blooming is detected by the luminance detector when the signal processor does not normally detect the lane marking, and generate the mask for removing the blooming and superpose the mask on blooming of the image through the mask generator when the blooming being detected is confirmed, wherein the controller determines that the blooming is detected when the luminance detector detects at least a predetermined percentage of pixels having luminance levels higher than a luminance reference level.

6. The apparatus of claim 5, wherein the luminance reference level is set to a value greater than 80% of a maximum luminance level of each pixel and the predetermined percentage is set to a value greater than 1% of a maximum number of pixels of the image.

7. The apparatus of claim 5, wherein the controller controls the mask generator to generate the mask having a low luminance level and superposes the mask on a high luminance level region corresponding to the blooming in the image.

8. The apparatus of claim 7, wherein the mask generator generates the mask having a shape corresponding to the high luminance level region in the image.

* * * * *